(12) United States Patent
Hughes et al.

(10) Patent No.: US 7,749,301 B2
(45) Date of Patent: Jul. 6, 2010

(54) PROCESS FOR COPPER CONVERTING

(75) Inventors: Stephen Peter Hughes, Black Rock (AU); Robert W Matusewicz, Oakleigh (AU); Ross Alexander McClelland, Berwick (AU); Antony Acquadro, Box Hill North (AU); Brian Ross Baldock, Skye (AU)

(73) Assignee: Ausmelt Limited, Dandenong, Victoria (AU)

( * ) Notice: Subject to any disclaimer, the term of this patent is extended or adjusted under 35 U.S.C. 154(b) by 0 days.

(21) Appl. No.: 10/599,570

(22) PCT Filed: Apr. 6, 2005

(86) PCT No.: PCT/AU2005/000496

§ 371 (c)(1),
(2), (4) Date: Jan. 31, 2007

(87) PCT Pub. No.: WO2005/098059

PCT Pub. Date: Oct. 20, 2005

(65) Prior Publication Data

US 2007/0175299 A1    Aug. 2, 2007

(30) Foreign Application Priority Data

Apr. 7, 2004    (AU) .............................. 2004901900

(51) Int. Cl.
  *C22B 15/00*    (2006.01)
(52) U.S. Cl. ........................................ 75/643
(58) Field of Classification Search ................ 75/643
  See application file for complete search history.

(56) References Cited

U.S. PATENT DOCUMENTS

| 1,922,301 A | * | 8/1933 | Kekich .......................... 75/643 |
| 3,281,236 A | * | 10/1966 | Meissner ...................... 75/643 |
| 3,527,449 A | | 9/1970 | Worner |
| 4,251,271 A | | 2/1981 | Floyd |
| 4,308,058 A | | 12/1981 | Makipirtti et al. |
| 5,888,270 A | * | 3/1999 | Edwards et al. ................ 75/643 |

FOREIGN PATENT DOCUMENTS

WO    WO 01/49890    *    1/2001

OTHER PUBLICATIONS

Copper Smelting—Generalized, www.elmhurst.edu/~chm/vchembook/335coppersmelter.html (last visited Feb. 2, 2009).*

(Continued)

*Primary Examiner*—Roy King
*Assistant Examiner*—Yoshitoshi Takeuchi
(74) *Attorney, Agent, or Firm*—Norris McLaughlin & Marcus, PA

(57) ABSTRACT

The process for converting a copper sulphide matte to blister copper, is achieved by adding the copper sulphide matte and flux to a suitable agitated slag phase; and injecting, from a discharge tip at the lower end of a top-submerged lance, an oxidizing gas suitable for reacting with the matte to produce blister copper which forms or adds to a continuous blister copper phase below the slag phase. The lance tip is located within the slag phase at a depth enabling the injected gas to agitate the slag phase, and to react with copper sulphide matte dispersed therein, while precluding a substantial proportion of the gas from contacting the continuous blister copper phase.

13 Claims, 3 Drawing Sheets

OTHER PUBLICATIONS

International Preliminary Report on Patentability dated Jul. 12, 2006 for PCT/AU2005/000496.

International Search Report dated May 25, 2005 for PCT/AU2005/000496.

* cited by examiner

PROCESS FOR COPPER CONVERTING

This is a 35 USC 371 application of PCT/AU2005/000496.

FIELD OF THE INVENTION

This invention relates to a process for the production of blister copper.

BACKGROUND TO THE INVENTION

The production of blister copper to date has been dominated by use of Pierce-Smith converters. However these converters are progressively falling further behind environmentally acceptable standards for off-gas emissions. In more recent times, technologies such as those developed by Outokumpu and Mitsubishi have been adapted to the production of blister copper. These not only provide an improvement in environmental performance over the Pierce-Smith converters, but also improve the scale of operation and productivity. Still more recent is the proposal of Edwards et al disclosed in U.S. Pat. No. 5,888,270, issued 30 Mar. 1999.

The proposal of Edwards et al utilises what is referred to as a lance based process. More specifically, the process uses a top-submerged injection lancing furnace in which an injection lance is lowered from above a molten bath to submerge a discharge tip at its lower end for injection within the bath. The bath consists of a continuous slag phase, in particular of a calcium ferrite slag, which floats on a continuous molten blister copper phase. Matte and/or concentrate, together with a suitable flux, is added to the slag phase while that phase is agitated by the submerged injection of an oxidizing gas capable of reacting with the matte and/or concentrate to form blister copper. The lance tip is located deep within the slag phase to ensure that a substantial proportion of injected oxidizing gas contacts the blister copper phase.

It is suggested in Edwards et al that contact of oxidizing gas with the blister copper oxidises the blister copper and generates copper oxide which floats to an interface between the slag and blister copper phases. It is further suggested that the copper oxide reacts with matte or concentrate which reaches the interface, or alternatively is dissolved or dispersed in the slag to react with the matte or concentrate. It also is contended that the copper oxide assists desulphurisation of the copper and improves the utilization of oxygen by the sulphur with concomitant reduction of the sulphur content of the blister copper and of copper losses to the slag. However, low sulphur blister copper contents are said to be achieved by injecting oxygen directly into the copper layer, as distinct from merely deeply injecting the oxygen in the slag for contacting the copper layer at its interface with the slag layer.

The present invention also relates to a process for producing blister copper by top-submerged injection. However, the process of the invention is directed to a process which obviates the need for a substantial proportion of an oxidizing gas to make contact with the blister copper phase, or for any need for injection into the copper phase through its interface with the continuous slag phase.

BROAD OUTLINE OF THE INVENTION

The present invention provides a process for converting a copper sulphide matte to blister copper, wherein the process includes the steps of:

adding the copper sulphide matte and flux to a suitable agitated slag phase; and injecting, from a discharge tip at the lower end of a top-submerged lance, an oxidizing gas suitable for reacting with the matte to produce blister copper which forms or adds to a continuous blister copper phase below the slag phase;

wherein the lance tip is located within the slag phase at a depth enabling the injected gas to agitate the slag phase, and to react with copper sulphide matte dispersed therein, while precluding a substantial proportion of the gas from contacting the continuous blister copper phase.

The process of the invention is conducted with a substantial depth of slag. This is a depth which, with the required lance tip location, enables agitation of the slag phase by the top-submerged injection therein without a stream or jet of the injected gas passing through to the lower surface of the slag phase. The actual depth of slag can vary with a number of factors, including the size and shape of the furnace or reactor, and the number of and spacing between lances where more than one is used. The depth of slag may range from a minimum of about 500 mm up to about 2 m, preferably about 700 mm to about 1.7 m.

The depth of the slag phase and the requirements for top-submerged injection in the present invention have a number of practical benefits. A first benefit is that start-up of the process is facilitated in that a blister copper phase need not initially be present at all or to a significant extent. In contrast, the process of Edwards et al necessitates the presence of a blister copper phase at the outset, in order to prevent gas which is to contact that phase from impinging on refractory lining of the furnace, or to use a modified mode of operation until a sufficient depth of blister copper has been produced.

A further benefit of the requirements of the present invention for top-submerged injection is that injection is able to be at a significant height above the lower surface of the slag phase. Due to this, the submerged injection need not be directed towards that surface, but instead can be directed downwardly and laterally outwardly. Thus, the injection is able to be at a mid-region of the slag phase, or nearer to the top of the slag phase where this is relatively shallow, and directed laterally outwardly from the lance tip. The injected gas is able to be directed downwardly and laterally outwardly in a plurality of streams angularly spaced around the tip of the lance. In this way, the gas more readily is able to agitate the entire slag phase body, thereby facilitating uniform dispersal of the copper sulphide matte throughout the slag phase. This enables substantially maximum utilization of the slag phase as a reaction medium in which the matte is able to be oxidised, thereby enhancing the overall efficiency of operation of the process. The process of the present invention therefore may be conducted with a lance which has an outlet tip provided with a plurality of suitable oriented outlets for providing a plurality of downwardly and outwardly directed streams. However, the lance more preferably has vanes or swirlers which impart helical flow to gas passing therethrough for injection, to maximise mixing of the gas with, and turbulence in, the slag phase. In each case the lance is of a form that provides injected gas with a radial injection component to promote dispersion of the gas into the slag phase and avoid penetration of gases into the metal phase.

Since the slag is the reaction medium for conversion of the copper sulphide matte to blister copper, the volume of the slag phase is a factor which contributes to the rate of production of blister copper. The indicated requirements for top-submerged injection enable use of a relatively large slag phase volume for a given reactor and, hence, a relatively high rate of production of blister copper. In contrast, the mode of injection required by the process of Edwards et al tends to confine the effective volume of slag phase to a lower region of the available slag phase volume. Certainly, in the process of Edwards et al, there can be a substantial depth of slag phase. However, the upper region of the slag phase tends to provide a less effective part of the overall volume for efficient production of blister copper and the extent of the upper region increases with increasing slag phase depth. Also, with increasing depth of the slag phase, there is an increased risk of problems arising from vibration of the furnace induced by the high velocity and mass flow rate of the injected gas.

A still further benefit of the requirements of the present invention for top-submerged injection is the reduction of competing reactions. Thus, contrary to the proposal of Edwards et al, it is preferable to avoid oxidation of copper in the continuous blister copper phase and the present invention facilitates this avoidance.

Overall, there are significant differences between the present invention and the process of Edwards et al in relation to the slag phase. Edwards et al teaches the use of a deep slag layer in order to:

(a) allow time for the copper sulphide matte or copper concentrate to melt and react with the slag;
(b) maintain the matte as a dispersion—but reaction between the matte and slag is maximised while reaction between the matte and blister copper is to be minimised; and
(c) ensure the slag is well agitated by the injected gas while injecting a substantial portion of the injected oxygen into the blister copper by a deeply submerged lance, in the maintained deep slag phase.

The injection of a substantial portion of the oxygen into the blister copper will result in a lower region of the slag phase in which blister copper is dispersed. However, reaction between matte (in the slag) and blister copper (dispersed in a lower region of the slag) is to be minimised. Thus, it is evident that substantially all or a substantial proportion of the matte needs to be reacted to produce blister copper before it reaches the lower region of the slag phase. However, it is difficult enough to minimise reaction between matte and blister copper in the process of converting matte to blister copper without, at the same time, dispersing blister copper from the layer of blister copper phase into the region of the slag in which the matte is dispersed.

In contrast, the present invention, while able to accommodate a similar depth of slag phase, does not necessitate this. Also, regardless of the slag phase depth, the present invention enables and benefits from a slag phase in which matte is relatively uniformly or homogeneously dispersed, rather than one in which compositional strata or gradients are to be generated. Additionally, the invention obviates the need for injection into the blister copper phase, and that phase is able to be maintained as a relatively quiescent phase in which blister copper being produced by the process is able to collect. Thus, with continuous converting of matte, the process of the invention is considerably more amenable to tapping of blister copper, either continuously or at intervals, without the need to interrupt top submerged injection.

As indicated above, the proposal of Edwards et al is illustrated by reference to a calcium ferrite slag. That slag preferably is highly oxidised and has copper oxide, calcium oxide, and ferric and ferrous oxides as its main components, and also some silica. The use of a calcium ferrite slag is in accord with recent recommended and accepted practice, such as illustrated by the use of calcium ferrite slags in the conversion stage of the Mitsubishi process. However, there are significant difficulties with the use of calcium ferrite slags in copper converting. As a result, there recently has been work on investigating the use of ferrous calcium silicate slags.

Calcium ferrite slags are used in the converting stage of the Mitsubishi process. This is in contrast to the iron silicate slags used in the first, smelting stage of the Mitsubishi process, and also used throughout Pierce-Smith converting. The calcium ferrite slags present a wide, homogeneous liquid area when mixed with iron oxides. This enables them to absorb iron oxide generated during converting. The calcium ferrite slags thus are able to avoid troublesome magnetite precipitation and so obviate the risk of slag foaming which magnetite precipitation can cause with iron silicate slags. However, the calcium ferrite slags have their own problems. One major problem with calcium ferrite slags results from their high fluidity/low viscosity. Also, they cause excessive refractory damage, and have a low lead removal ratio. Additionally, the calcium silicate slags retain substantial quantities of copper oxide, while they are not suitable for subsequent treatment by flotation or reduction in conventional slag cleaning furnaces for the recovery of copper. This limits the treatment of the resulting slag to recycling as a solid to a smelting stage. Moreover, calcium ferrite slags have little tolerance for silica which may enter the process as impurities in the feed streams either because silica is inherent in the feed materials or inadvertently is introduced through contamination. The extent of the problems with calcium ferrite slags is reflected by the move to ferrous calcium silicate slags, despite these being relatively untested on a commercial scale.

In an important form of the present invention, the slag phase is an iron based silicate slag, although other slags can be used. The iron based silicate slag may be an iron silicate (fayalite) slag, a lime modified iron silicate slag, or a ferrous calcium silicate (olivine) slag. In other contexts, the iron based silicate slag system has known problems. We have found that these problems can be overcome or avoided with use of the present invention. Also, we have found that the known benefits of the iron based silicate slags are able to be retained with use of the present invention. Thus, the process of the invention is able to be based on a slag phase with which the industry is familiar. Also, in converting copper sulphide matte, it is possible to integrate the process with an existing smelting plant producing the matte, with the slag resulting from the process of the invention able to be treated readily by way of recycle, flotation or reduction to recover contained copper. Moreover, blister copper product is able to be of a required commercial quality, such as with respect to a low sulphur content.

The preferred iron based silicate slag used for the slag phase in the present invention has a composition which is significantly different to the calcium ferrite slag taught by Edwards et al. This is illustrated by reference to particularly preferred compositional ranges for the iron based slag shown in the following Table 1.

TABLE 1

Slag Comparison

| | $Fe/SiO_2$ | CaO/Fe | $CaO/SiO_2$ |
|---|---|---|---|
| Edwards et al | 7.14-66.67* | 0.15-0.7 | 5-10 |
| Invention | 1.14-2.11 | 0.15-0.92 | 0.22-1.11 |

*calculated based on cited CaO/Fe and $CaO/SiO_2$ ratios

While the overall ratio $Fe/SiO_2$ is 1.14 to 2.11, it may, for example, be from 1.14 to 1.55.

GENERAL DESCRIPTION OF THE DRAWINGS

In order that the invention may more readily be understood, description is directed to the accompanying drawings, in which.

DETAILED DESCRIPTION OF THE DRAWINGS

Figure 1:
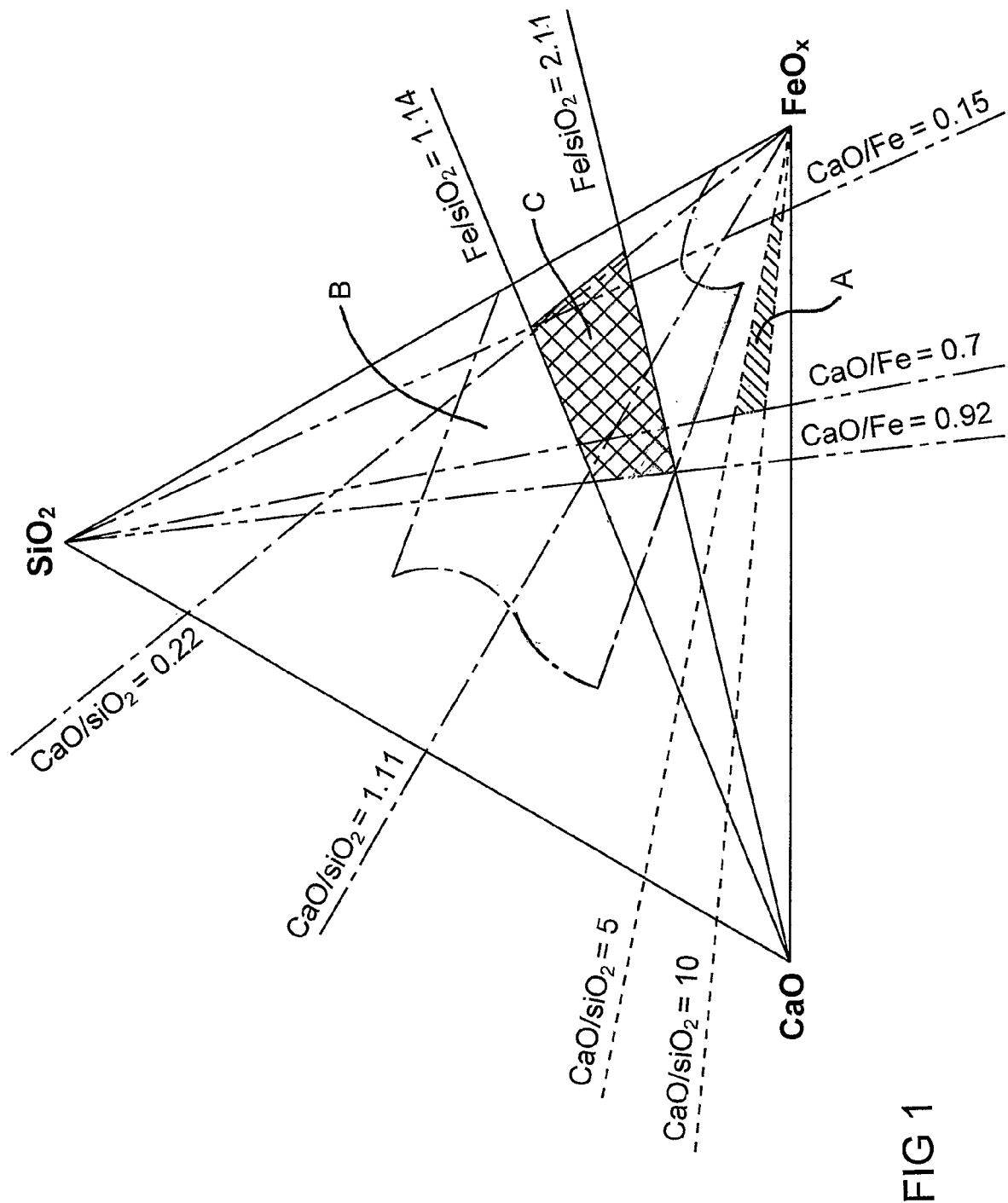
FIG. 1 shows a phase equilibrium diagram relevant to the iron based silicate slags preferred for the present invention.

The differences between the composition of iron based silicate slags of the present invention and calcium ferrite slags are further illustrated by FIG. 1. In FIG. 1 there is shown a simplified $CaO$—"$FeO_x$"—$SiO_2$ oxide system phase equilibrium diagram. It is to be understood that this is a two dimensional ternary projection of a quaternary system that includes $Fe^{2+}$ and $Fe^{3+}$, due to the varying levels of both $Fe^{2+}$ and $Fe^{3+}$ in the respective slag systems.

In FIG. 1, three regions of the diagram have been highlighted. The first region A is the area containing the calcium ferrite slags of Edwards et al. The region B contains the iron based silicate slags preferred for the present invention, while region C within region B contains the particularly preferred iron based silicate slags for use in the present invention.

The region A, as shown in FIG. 1, is constrained by the lines $CaO/SiO_2=5$ and $CaO/SiO_2=10$ and by the lines $CaO/Fe=0.15$ and $CaO/Fe=0.7$. The precise boundaries for regions B and C are yet to be fully delineated. However, current indications are that region C is bordered by the lines $Fe/SiO_2=1.14$ and $Fe/SiO_2=2.11$, such as from 1.14 to 1.55. Overall, the region C is illustrated by the compositions shown in Table 2.

TABLE 2

Slag Compositions

| Examples | $Fe/SiO_2$ | $CaO/Fe$ | $CaO/SiO_2$ |
|---|---|---|---|
| 1 | 1.55 | 0.17 | 0.27 |
| 2 | 1.20 | 0.24 | 0.29 |
| 3 | 1.14 | 0.24 | 0.27 |
| 4 | 1.34 | 0.20 | 0.27 |
| 5 | 1.47 | 0.15 | 0.22 |
| 6 | 1.28 | 0.75 | 0.96 |
| 7 | 1.21 | 0.92 | 1.11 |
| 8 | 2.11 | 0.33 | 0.70 |

Thus, considerable variability is possible with the iron based silicate slags able to be used in the present invention. This can enable a specific converting operation to be based on a slag composition best suited for use with locally available fluxes, or in accordance with the level of impurities reporting in the matte to be fed to the converting process conducted in that installation.

As indicated, the move to calcium ferrite slags, such as in the Mitsubishi process and followed in the proposal of Edwards et al, was in part to avoid the risk of slag foaming due to precipitation of magnetite. The calcium ferrite slags have a relatively high solubility limit for magnetite, thereby enabling them to reduce the tendency for foaming to occur. However, while iron based silicate slags have a lower solubility for magnetite, they can be used in the process of the present invention with little risk of foaming. This is believed to be due, in large part, to the requirements of the present invention for top-submerged injection. That is, that injection results in a more uniform or homogeneous slag phase in terms of agitation and of the dispersion therein of matte. Also, by not injecting gas into the blister copper phase, the present invention reduces the risk of producing a third phase comprising a slag/metal emulsion, with the risk of this triggering slag foaming.

It is found that the risk of foaming is able to be further reduced in the process of the present invention by the addition of a suitable reductant operable to reduce or prevent the formation of magnetite. Lump coal is a suitable reductant, in view of its tendency to float on the slag surface, such that slag is able to circulate to the coal under the agitation generated by submerged injection. The addition of lump coal is proposed in Edwards et al. However, this is to reduce the copper content of the slag for a given sulphur content in the blister copper. It is not to reduce the risk of foaming by preventing the formation of magnetite and that risk is obviated in Edwards et al by the choice of slag.

Figure 2:
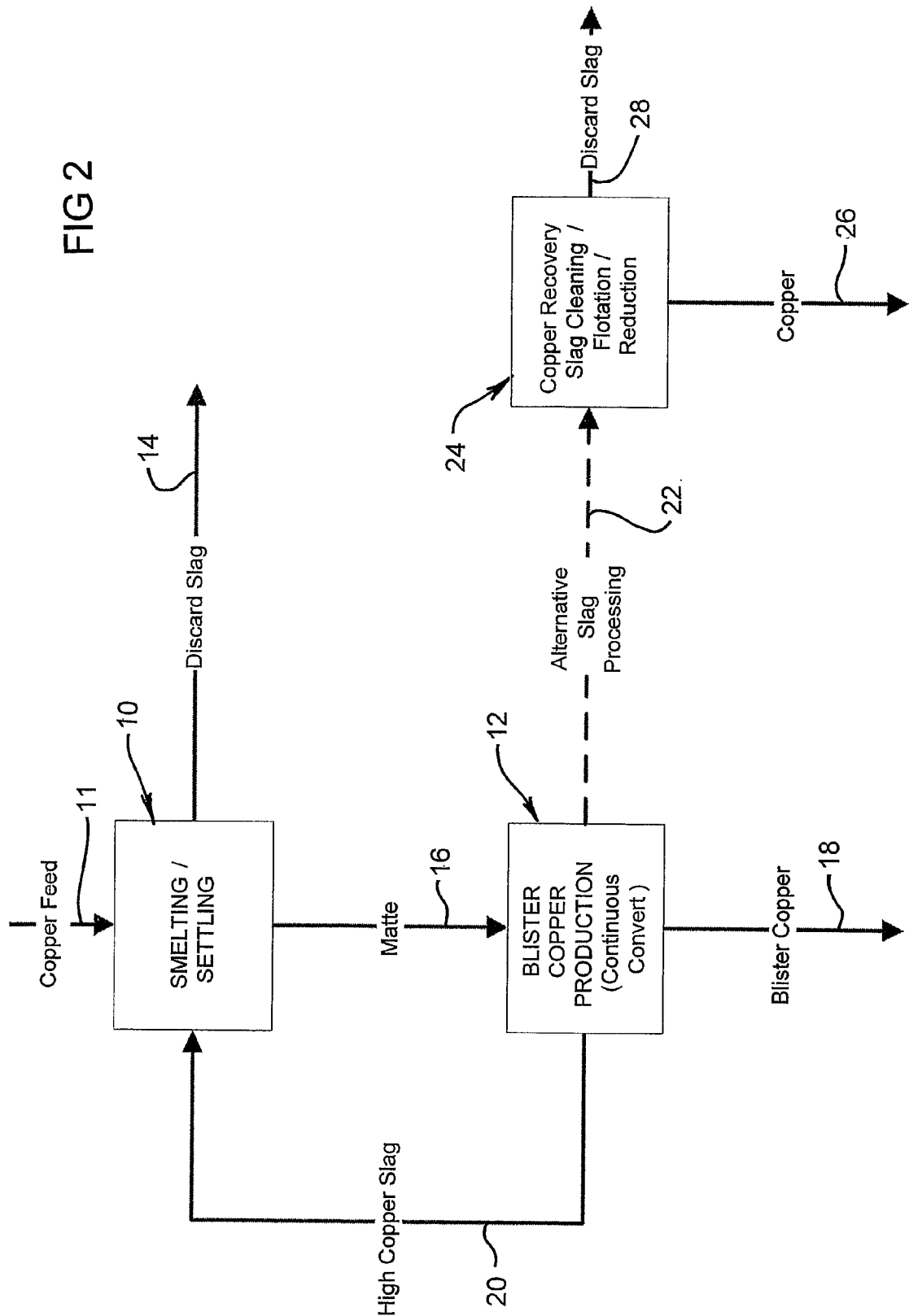
FIG. 2 is a flowsheet illustrating forms enabling continuous converting according to the present invention.

A flowsheet, illustrating the present invention in a form enabling continuous converting, is shown in FIG. 2. The flowsheet shows a smelting/settling furnace 10 into which copper feed is received as shown at 11. Also shown is a converting furnace 12 operable in accordance with the present invention. The smelting/settling furnace 10 can be of any type suitable for smelting copper feed, comprising a copper sulphide concentrate, to produce a copper matte product and a slag. The slag produced in furnace 10 may be discardable as shown at 14, or suitable for further processing. After smelting, the matte and slag are allowed to settle to enable the slag to be discharged and the matte to be passed as shown at 16 to the converting furnace 12. While the smelting/settling furnace 10 can be of any suitable type, a top-submerged lancing reactor is used as furnace 12 for the converting stage.

The matte produced in furnace 10 and transferred to furnace 12 may be of any grade suitable for converting to produce blister copper. It typically will range from 30% to 70% copper with various levels of Fe and S. The feed for the converting stage in furnace 12 preferably is produced from an earlier smelting/settling operation in furnace 10 in which a sufficient quantity of matte is produced to enable continuous converting over a sufficient interval of time. Thus, the matte may be stockpiled until such quantity is achieved. However, additional matte may be derived from another source.

The matte feed material for converting may be fed to furnace 12 via a charging port in the roof of the top-submerged reactor comprising furnace 12, or via either a dedicated or specialised lance. The feed material need only be of a suitable size to allow it to be conveyed by the chosen feeding means, while it does not need to be dried. It is preferred that the matte feed material is granulated, for example as a product from smelting/settling furnace 10 following the smelting of concentrate. However, at least part of the matte feed material may be supplied from the smelting/settling furnace 10 in the hot, molten state.

In addition, other copper containing materials, such as reverts or scrap may be charged to furnace 12 to allow efficient recovery of the contained copper. This may also be used for the control of process temperature. However, process temperature additionally or alternatively may be controlled by the addition of minor amounts of fuel, injected via the submerged lance or otherwise charged to the slag.

In the process of converting matte in furnace 12, to produce blister copper output from furnace 12 as shown at 18, the Fe and S present in the matte are removed by reaction with oxygen by:

$$2FeS + 3O_2 \rightarrow 2FeO + 2SO_2 \quad (1)$$

$$3FeS + 5O_2 \rightarrow Fe_3O_4 + 3SO_2 \quad (2)$$

$$Cu_2S + O_2 \rightarrow 2Cu + SO_2 \quad (3)$$

$$2Cu_2S + 3O_2 \rightarrow 2Cu_2O + 2SO_2 \quad (4)$$

Thus, iron reports as iron oxide in the slag, while S reports as $SO_2$ in the converting furnace off-gas stream.

Two important factors during the converting operations are:
(i) slag chemistry and copper losses to the slag, and
(ii) the final quality of the blister copper.

On the issue of slag chemistry, typical converting operations in Pierce-Smith converters make use of the addition of silica to promote the formation of a molten iron silicate (fayalite) slag. Iron oxidised from the matte is taken up in that slag, reducing the formation of a solid magnetite phase. In large quantity, solid magnetite phase would make the slag unworkable, and lead to high copper losses due both to physical copper entrainment in the slag and to copper solubility.

As indicated herein, the present invention utilises a mode of top-submerged injection during converting in the reactor comprising furnace 12, which obviates or overcomes perceived problems with iron silicate slags which, at least in part, contributed to the move away from those slags. Thus, the present invention preferably uses an iron based silicate slag, such as of fayalite or olivine composition. As detailed above, these slags provide significant benefits.

Our testwork has shown that a well controlled iron based silicate slag, such as of the fayalite type, enables acceptable levels of copper in slag. This is particularly so for slag to be recycled from furnace 12 to furnace 10, as represented by solid line 20. Irrespective of the actual level of copper in recycled slag, that contained copper may be readily recovered by further processing as described later herein. Our testwork also has shown that, as detailed earlier herein, slag foaming is able to be prevented, or at least controlled.

As indicated above, blister copper product quality is of importance. The level of sulphur remaining in blister following processing is important, as too high a level requires additional processing downstream in order to remove it. An important relationship exists between the level of S in the blister copper and the level of copper reporting to slag. These levels are related to the oxygen potential needed to remove sulphur to a desired level and the effect of over-oxidising a portion of the copper to slag as $Cu_2O$, by reaction (4) detailed above. Results obtained in a pilot plant operation in accordance with the present invention showed that a low level of Cu in slag can be achieved together with a good level of S in blister copper, as indicated in Table 3. In each of the Examples of Table 3, the pilot plant operation was with a respective slag composition shown for the corresponding Example number in Table 2.

TABLE 3

Blister Quality v. Cu to Slag

| Example | Blister % S | Slag % Cu |
|---|---|---|
| 1 | 0.3 | 11.8 |
| 3 | 0.02 | 35.8 |

TABLE 3-continued

Blister Quality v. Cu to Slag

| Example | Blister % S | Slag % Cu |
|---|---|---|
| 4 | 0.03 | 23.0 |
| 5 | 0.4 | 14.3 |
| 7 | 0.2 | 9.5 |
| 8 | 0.75 | 15.7 |

The process of Edwards et al is characterised by the level of sulphur in the blister copper being affected by the lance tip position. This necessitates the lance tip being as close as possible to the interface between the slag and blister copper phases. With the present invention, the position of the lance tip is important, as detailed earlier herein, but is not a significant factor in achieving good quality blister product.

As indicated, slag from furnace 12 may be recycled to furnace 10 to enable recovery of its copper content. However, in an alternative arrangement also shown by FIG. 2, the slag from furnace 12 may be passed, as shown by broken line 22, to concentration installation 24. In installation 24, the slag received from furnace 12 can be processed in stages of slag cleaning, grinding, flotation to produce a copper concentrate and reduction smelting of the concentrate to produce a copper product at 26 and a discardable slag at 28.

Figure 3:
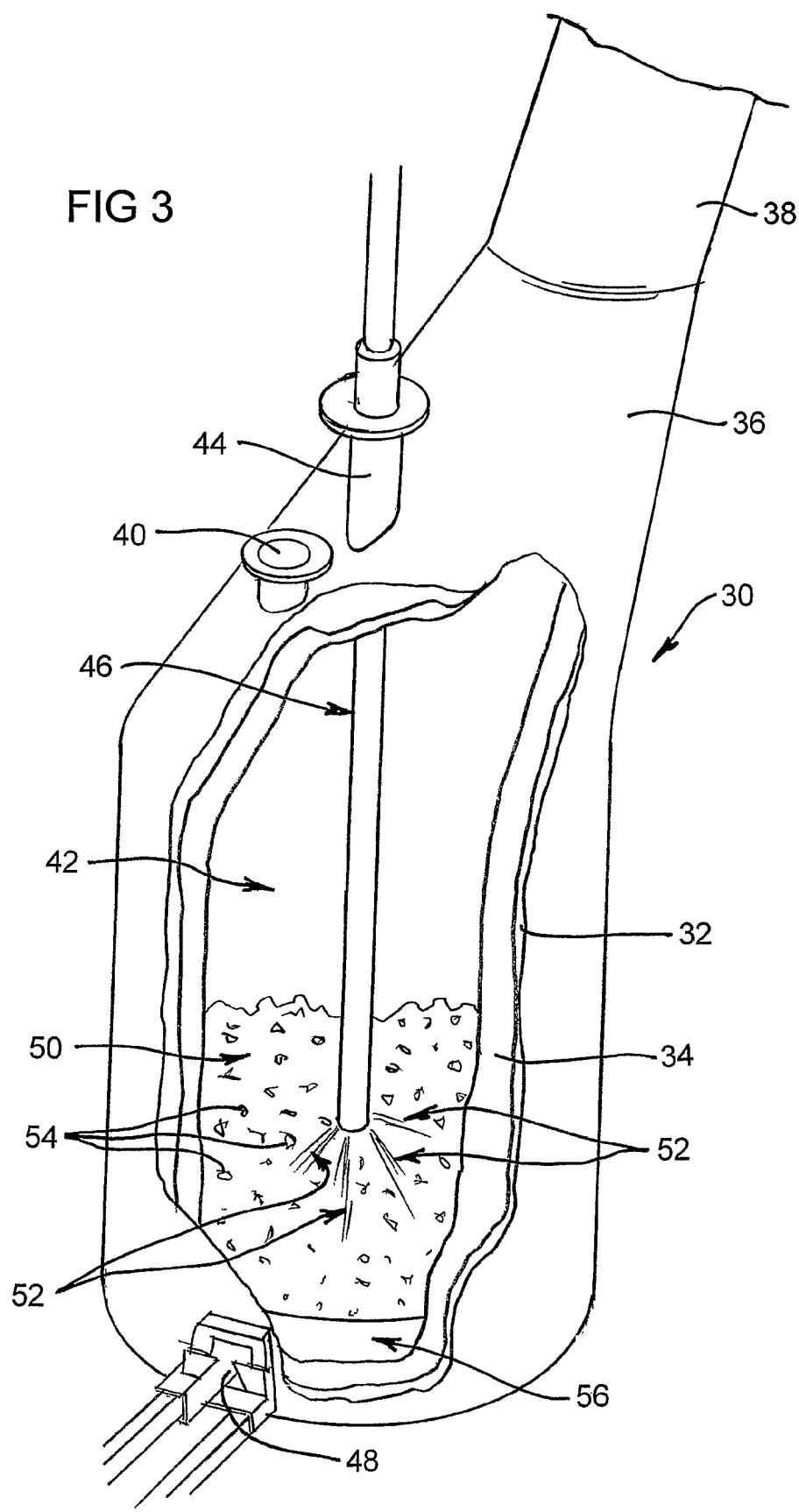
FIG. 3 is a partly broken away perspective view of a top submerged injection lance reactor according to the present invention.

FIG. 3 shows a top submerged lancing reactor 30 suitable for use as the reactor comprising furnace 12 of FIG. 2. The reactor 30 has an upright cylindrical body having an outer shell 32 of steel and an internal refractory lining 34. Reactor 12 also has an asymmetrically tapered upper portion 36 which leads to an off-take flue 38.

At an upwardly facing region of its portion 36, reactor 30 has a charging port 40 by which feed material is able to be charged into the interior 42 of the reactor. Port 40 preferably has an adjustable feeding means (not shown) which, while allowing material to be charged to reactor 30, minimises loss of reactor gases from interior 42 via port 40. Adjacent to port 40, reactor 30 has a tubular housing 44 through which an elongate top-submerged injecting lance 46 is inserted. Also, adjacent to its base, reactor 30 has a tapping hole 48.

In use of reactor 30, the lower, discharge end of lance 46 is submerged in molten slag 50 contained within reactor 30. An oxygen-containing gas is supplied through lance 46 to generate jets 52 of oxidizing gas within slag 50 to agitate the slag. Copper sulphide matte is charged into reactor, via port 40, or entrained in the gas injected by lance 46, or by a combination of these two charging arrangements. In each case, the matte is dispersed, as lumps or granules 54, throughout the agitated slag 50. The matte 54 thus is exposed to and reacted with the oxygen content of the injected gas to form droplets of blister copper. The droplets fall through the slag 50 and collect therebelow as a continuous blister copper phase 56.

During the conversion of copper sulphide matte 54 to blister copper 56, control is necessary over the vertical position of lance 46. As indicated, the lower end of lance 46 is submerged in the agitated slag phase. Thus, jets 52 issuing from the lower, discharge end of lance 46 are injected within the slag phase. In the arrangement shown, lance 46 has an angular array of outlet nozzles at its discharge end, with a respective jet 52 issuing from each outlet. The arrangement is such that the jets 52 diverge downwardly and laterally outwardly from each other. In alternative arrangements, the jets 52 need not diverge, but may simply be directed downwardly, or there may be a single jet directed either downwardly or laterally and downwardly. In each case, the arrangement is to achieve agitation of the slag 50, dispersion of the matte 54 throughout the slag 50, and reaction of the oxygen content of the injected gas with the matte 54 to produce droplets of blister copper. However, discharge end of lance 46 within the slag phase is to be such as to preclude a substantial proportion of the injected gas from contacting the continuous blister copper phase 52.

The requirement of the invention that a substantial proportion of the injected gas is precluded from contacting the continuous blister copper phase 52 is such as to avoid the streams of injected gas from penetrating that continuous phase. Thus, while a minor proportion of the injected gas may sweep over the surface of the continuous blister copper phase, jets of the gas are not to pass beyond the interface between the slag phase and the continuous blister copper phase. Preferably the location of the lance tip is such as to completely preclude jets of injected gas from directly contacting or impinging on that interface.

As will be appreciated, a flux needs to be charged to reactor 30 in order to maintain a suitable depth of slag phase and maintenance of slag oxide ratios during the course of converting reactions and to allow for periodic tapping of slag. The flux may be charged via port 40 and/or via lance 46, with or separately from the feed of copper sulphide matte.

As is preferred for the present invention, the slag phase 50 comprises an iron based silicate slag, such as a fayalite or olivine slag. The slag may, for example, have a composition similar to that of any one of the Examples set out in Table 2. While such slags can be used with little risk of foaming, that risk can be further reduced by addition of coal to reactor 30 via port 40. The coal preferably is supplied as lumps able to float on the slag phase 50. Agitation of the slag by the injection via lance 46 sufficiently causes the slag to circulate to the floating coal lumps, whereby the reducing action of the coal reduces or prevents formation of magnetite in the slag phase 50.

Finally, it is to be understood that various alterations, modifications and/or additions may be introduced into the constructions and arrangements of parts previously described without departing from the spirit or ambit of the invention.

The invention claimed is:

1. A process for converting a copper sulfide matte to blister copper, wherein the process includes the steps of:
    adding the copper sulfide matte and flux to an agitated iron based silicate slag phase; and
    injecting, from a discharge tip at the lower end of a top-submerged lance, an oxidizing gas suitable for reacting with the matte to produce blister copper which forms or adds to a continuous blister copper phase below the iron based silicate slag phase;
    wherein the depth of the iron based silicate slag phase and the level at which the discharge tip of the lance is located in the slag phase are such that the injected oxidizing gas agitates the slag phase and reacts with copper sulfide matte dispersed in the slag phase but so that a jet or stream of the injected oxidizing gas is unable to pass through a lower surface of the slag phase and the oxidizing gas within the jet or stream is precluded from contacting the continuous copper phase.

2. The process of claim 1, wherein the slag phase has a depth of from about 500 mm up to about 2 m.

3. The process of claim 1, wherein the slag phase has a depth of from about 700 mm to about 1.7 m.

4. The process of claim 1, wherein the injection is at a mid-region of the height of the slag phase.

5. The process of claim 1, wherein the injection is near the upper surface of the slag phase.

6. The process of claim 1, wherein the injection is directed downwardly and laterally outwardly for agitating substantially the entire slag phase for substantially uniform dispersal of the copper sulfide matte throughout the slag phase.

7. The process of claim 1, wherein the iron based silicate slag is a lime modified iron silicate slag.

8. The process of claim 7, wherein the iron based silicate slag is a ferrous calcium silicate olivine slag.

9. The process of claim 7, wherein the iron based silicate slag is an iron silicate fayalite slag.

10. The process of claim 7, wherein the iron based silicate slag has a ratio of Fe to $SiO_2$ of from 1.14 to 2.11, a weight to weight ratio of CaO to Fe of from 0.15 to 0.92, and a weight to weight ratio of CaO to $SiO_2$ of from 0.22 to 1.11.

11. The process of claim 10, wherein the weight to weight ratio of Fe to $SiO_2$ is from 1.14 to 1.55.

12. The process of claim 1, wherein a reductant is added to the slag phase for reducing the formation of magnetite and thereby suppressing foaming of the slag phase.

13. The process of claim 12, wherein the reductant is lump coal.

* * * * *